No. 856,398. PATENTED JUNE 11, 1907.
R. W. DULL.
CHAIN.
APPLICATION FILED OCT. 15, 1906.
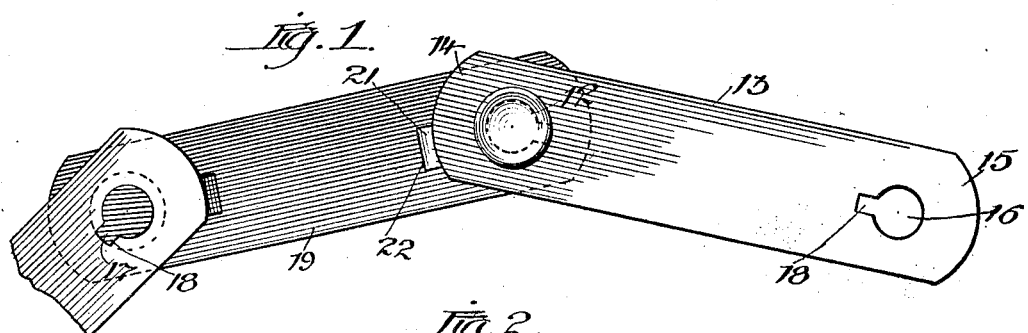
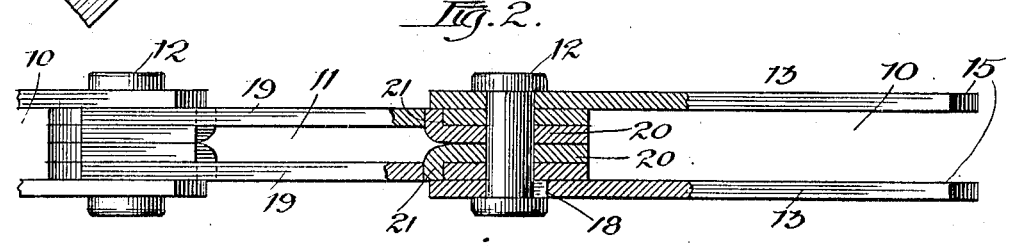
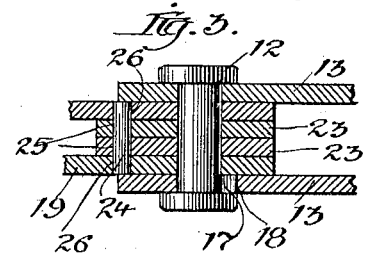
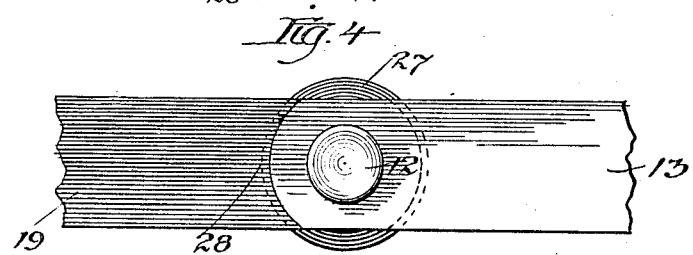
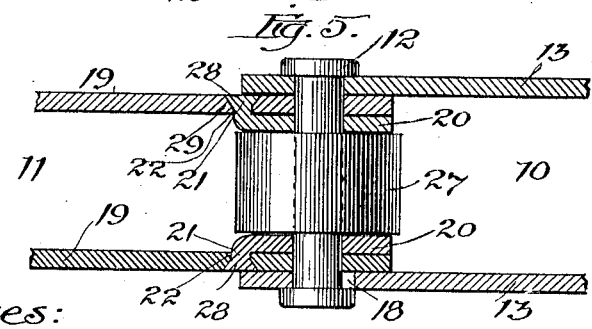
Witnesses:
Frank Blanchard
Charles B. Gillson
Inventor
Raymond W. Dull.
By Louis K. Gillson
Attorney

UNITED STATES PATENT OFFICE.

RAYMOND W. DULL, OF AURORA, ILLINOIS, ASSIGNOR TO STEPHENS-ADAMSON MFG. CO., A CORPORATION OF ILLINOIS.

CHAIN.

No. 856,398.　　Specification of Letters Patent.　　Patented June 11, 1907.

Application filed October 15, 1906. Serial No. 339,006.

*To all whom it may concern:*

Be it known that I, RAYMOND W. DULL, a citizen of the United States, and a resident of Aurora, county of Kane, and State of Illinois, have invented certain new and useful Improvements in Chains, of which the following is a specification, and which are illustrated in the accompanying drawings, forming a part thereof.

The invention relates to sprocket chains having adjacent links united by a pivot pin, and contemplates means of simple and inexpensive construction for providing a large bearing surface upon which the pin may turn.

The object of the invention is to provide increased strength and durability in a chain having links so formed that each may be composed entirely of metal bars shaped only by such work as can be performed by means of a punch and die.

In the accompanying drawings Figure 1 is a side elevation of a detail of a sprocket chain constructed according to the invention, some of the parts being shown in vertical cross-section; Fig. 2 is a plan view of the same, partly in section; Fig. 3 is a detail sectional view showing a modified form of construction; and Figs. 4 and 5 are a side elevation and a plan section, respectively, of a still further modification.

A sprocket chain, adapted for the transmission of power or for supporting the flights or buckets of elevating and conveying machinery, is illustrated in the drawings, and as shown comprises a plurality of so-called outside links 10 and inside links 11, united by pivot pins 12. Each of the links 10 is preferably formed from a pair of flat metal bars 13, each having rounded ends 14, 15, and apertures 16 adjacent both ends for receiving the pivot pins 12. As shown the two bars 13 are spaced apart on the pivot pin, when the parts are assembled, to provide room between them for the end of the next adjacent inside link 11, which preferably also comprises a pair of parallel bars, as 19, each apertured at both of its ends to receive the connecting pins. Preferably the turning of the pin 12 in the members of the outside link is prevented by means of a key 17 formed on the pin below its head and engaging a slot or keyway 18 formed at the side of the aperture 16 of one of the bars 13.

By means of the invention the life of the chain is increased by providing a wide bearing surface at those points at which wear occurs when the links are turned on their pivotal connection, as in passing over a guide pulley or sprocket wheel, not shown. When the chain is constructed as so far described, all of this wear takes place at the bearing of the pivot pins 12 in the inside links 11, and, as shown, each of the side bars 19 of the links is reinforced adjacent its ends by a filling piece 20, apertured to receive the pivot pin 12 and anchored to the adjacent side bar to prevent longitudinal movement thereon.

In the form of construction shown in Figs. 1 and 2, each of the filling pieces 20 is anchored to one of the bars 19 by means of a lug 21, formed upon the inner end of the filling piece and fitting into a socket or aperture 22 formed in the bar.

In the form of construction shown in Fig. 3 filling pieces 23, 23, are provided for reinforcing the side bars 19 of the link, and each is secured against longitudinal movement by means of a pin 24 passing through suitable apertures 25 in the filling pieces and having its ends seated in apertures or sockets 26, formed in the side bars 19 of the link.

When in use the strains transmitted to the inside links 11 through the pivot pins 20 will be partly received directly by the side bars 19 and partly taken up by the filling pieces 20 or 23, through which they will be transmitted to the bars 19 by means of the lugs 21 or the pin 24. As shown the filling pieces 20 and 23 are of about the same thickness as the bars 19 and provide means, therefore, for doubling the amount of bearing surface upon which the pivot pin turns and correspondingly increase the durability of the chain.

In some instances, as when the chain is to be used in a horizontal position, it is desirable to provide an anti-friction roller for supporting the chain. As shown in Figs. 4 and 5, such a roller 27 may be applied to the pivot pin 12 between the two filling pieces 20, thus increasing the width of the chain. In this form of construction, in order to prevent the displacement of the filling pieces 20 and the cramping of the roller on the pin, each of the filling pieces is firmly secured in position, preferably by forming a head 28 on the lug 21 which projects into the socket 22 of the adjacent side bar 19. As shown, the head 28 is countersunk in the outer surface of the bar, the aperture or socket 22 being provided with tapered walls to receive the head, as indicated at 29.

I claim as my invention—

1. In a chain, in combination, a link comprising a pair of parallel bars each apertured adjacent one end, a second link fitting over the apertured ends of the bars, a pivot pin fixed against rotation in the last named link and passing through the apertures of the bars of the first named link, and a filler fitting over the pivot pin and anchored to one of the bars.

2. In a chain, in combination, two links having an overlapping end to end relation, a pin uniting the links and being fixed against rotation in one of them, and a filling piece having an aperture to receive the pin and being anchored to the other link.

3. In a chain, in combination, an open link comprising a pair of parallel side bars and a filling piece separating the bars adjacent one end of the link, such filling piece being anchored to one of the bars and all of such parts having a pivot aperture, a pivot pin passing through the apertures, and a second link engaging the pivot pin.

4. In a chain, in combination, a link comprising a pair of parallel bars each apertured adjacent one end, a second link fitting over the apertured ends of the bars, a pivot pin fixed against rotation in the last-named link and passing through the apertures of the bars of the first named link, a roller mounted on the pivot pin between the bars of such link, and a filler fitting over the pivot pin at each side of the roller and being anchored to the adjacent link bar.

5. In a chain, in combination, an open link comprising a pair of parallel side bars and a pair of filling pieces separating the bars adjacent one end of the link, one of such fillers being anchored to each of the bars and all of such parts having a pivot aperture, a pivot pin passing through the apertures, and a second link engaging the pivot pin.

RAYMOND W. DULL.

Witnesses:
R. H. ROBINSON,
E. M. WESTON.